United States Patent
Eriksen

(10) Patent No.: US 9,388,888 B2
(45) Date of Patent: Jul. 12, 2016

(54) POWER ACTUATOR DEVICE AND METHOD FOR SUBMERGED USE AT PETROLEUM EXPLOITATION

(71) Applicant: Electrical Subsea & Drilling AS, Straume (NO)

(72) Inventor: Egil Eriksen, Vassenden (NO)

(73) Assignee: Electrical Subsea & Drilling AS, Straume (NO)

(*) Notice: Subject to any disclaimer, the term of this patent is extended or adjusted under 35 U.S.C. 154(b) by 0 days.

(21) Appl. No.: 14/374,889

(22) PCT Filed: Feb. 7, 2013

(86) PCT No.: PCT/NO2013/050023
§ 371 (c)(1),
(2) Date: Jul. 25, 2014

(87) PCT Pub. No.: WO2013/119126
PCT Pub. Date: Aug. 15, 2013

(65) Prior Publication Data
US 2015/0008000 A1  Jan. 8, 2015

(30) Foreign Application Priority Data

Feb. 10, 2012 (NO) .................................... 20120138
Jan. 30, 2013 (NO) .................................... 20130157

(51) Int. Cl.
*F16H 25/20* (2006.01)
*E21B 33/06* (2006.01)
(Continued)

(52) U.S. Cl.
CPC ............ *F16H 25/20* (2013.01); *E21B 33/0355* (2013.01); *E21B 33/063* (2013.01); *H02K 5/132* (2013.01); *H02K 7/06* (2013.01); *F16H 2025/2046* (2013.01); *F16H 2025/2087* (2013.01); *Y10T 74/18576* (2015.01)

(58) Field of Classification Search
None
See application file for complete search history.

(56) References Cited

U.S. PATENT DOCUMENTS 4,867,000 A * 9/1989 Lentz .................. F15B 15/02
254/93 A
7,231,842 B2 * 6/2007 Biester ................ F16H 25/20
74/89.25
(Continued)

FOREIGN PATENT DOCUMENTS

DE 4329070 A1 3/1994
EP 0301960 A1 2/1989
(Continued)

OTHER PUBLICATIONS

International search report for application No. PCT/NO2013/050023 dated May 24, 2013.
(Continued)

*Primary Examiner* — Matthew R Buck
*Assistant Examiner* — Douglas S Wood
(74) *Attorney, Agent, or Firm* — Patterson & Sheridan, LLP

(57) ABSTRACT

Power actuator (2) device and method for submerged use at petroleum exploitation, where an electric motor (50) drives a displaceable actuating element (16) via a transmission element (80), and where the power actuator (2) comprises at least two parallel and cooperative screw-nut-connections (20) connected to the actuating element (16), and where the transmission elements (80) comprise a driving wheel (40) which synchronically drives a screw (22) or a nut (18) in each of the at least two screw-nut-connections (20).

8 Claims, 4 Drawing Sheets

(51) Int. Cl.
*H02K 7/06* (2006.01)
*H02K 5/132* (2006.01)
*E21B 33/035* (2006.01)

(56) References Cited

U.S. PATENT DOCUMENTS

| | | | | |
|---|---|---|---|---|
| 8,274,245 B2* | 9/2012 | Biester | ................ | F16H 25/2454 137/81.1 |
| 8,622,139 B2* | 1/2014 | Herbel | .................... | E21B 29/08 137/315.02 |
| 2014/0033842 A1* | 2/2014 | Morin | ..................... | F16H 19/04 74/89.17 |

FOREIGN PATENT DOCUMENTS

| | | |
|---|---|---|
| EP | 0836264 A1 | 4/1998 |
| GB | 2092702 A | 8/1982 |

OTHER PUBLICATIONS

International preliminary report on patentability for application No. PCT/NO2013/050023 dated Jan. 31, 2014.

* cited by examiner

POWER ACTUATOR DEVICE AND METHOD FOR SUBMERGED USE AT PETROLEUM EXPLOITATION

The present invention concerns a power actuator device for submerged use at petroleum exploitation. More specifically it concerns a device for power actuator for submerged use at petroleum exploitation where an electric motor drives a displaceable actuating element via a transmission element. The invention also concerns a method for building of a power actuator.

The term "power actuator" is used in order to emphasise that an actuator in accordance with the invention is particularly suitable for use where relatively large actuator forces are required. Below, the power actuator is shown connected to a cutting device in a blow-out preventer. This constitutes a typical use, but the power actuator is similarly suitable for a plurality of submerged uses.

During offshore petroleum exploitation it is necessary to be able to maneuver for example well tools, valves, connection devices or sealing devices. Some of these operations require relatively large forces.

Traditionally, devices of this kind have been hydraulically operated. Hydraulic operation most often requires hydraulic lines from the surface. In order to achieve precise maneuvering and necessary system redundancy it is necessary to arrange valves close to the actuator. Besides being relatively large and expensive, such hydraulic plants may also entail spills of considerable amounts of hydraulic fluid to the surroundings. There is also a desire to obtain reductions in weight and disruption time.

Because of the drawbacks, both the above-mentioned and others, in connection with hydraulic systems, electromechanical actuators for submerged use are developed. Such actuators are usually characterized in being provided with two driving systems and moreover that they are arranged to be able to be maneuvered by means of an external motor, for instance an ROV (Remotely Operated Vehicle).

US 2004/0056229 thus discloses an electro-mechanic actuator for a submerged choke valve where the actuator is provided with two independent electro-motors which through a worm drives a revolving spindle. The spindle is designed with a self-locking function.

WO 2005 068774 also shows an electro-mechanic actuator which is provided with two electro-motors and where the motors are connected to a revolving outgoing shaft.

Generally, prior art electro-mechanic actuators for submerged use are relatively big, complicated and expensive.

The invention has for its object to remedy or to reduce at least one of the drawbacks of the prior art.

The object is attained in accordance with the present invention through the features described below and through the subsequent claims.

In accordance with a first aspect of the invention a power actuator device for submerged use at petroleum exploitation is provided, where an electric motor drives a displaceable actuating element through a transmission element, and where the power actuator is characterized in comprising at least two parallel and cooperative screw nut connections connected to the actuating element, and where the transmission elements comprise a driving wheel which synchronically drives a screw or a nut in each of the at least two screw-nut-connections.

By distributing the actuating power onto a plurality of screw-nut-connections, relatively small, standardized screw components may be utilized. These may be traditional threaded connections of different kinds, ball nut connections or thread roll connections. The latter are available from for example SKF and are described in SKF's catalogues.

The power actuator may easily be provided with for example a pointer which connected to a control system may show the relative position of the actuating element in the power actuator, at any given time. This, in combination with control of the motor with regard to position, gives a double control when it comes to position. It is also easy to control the actuating power which the motor exerts against the actuating element by means of added effect. An operator thus may control both power and the relative position of the actuating element in the actuator, from the surface.

The driving wheel may be constituted of a gear wheel which is engaged with actuating wheels connected to the screw or the nut in the screw-nut-connections. Alternatively the driving wheel may for example be constituted of a chain wheel or a cogged transmission wheel which via a chain or a cogged transmission belt is engaged with actuating wheels connected to the screw or the nut in the screw-nut-connections.

The nut or the screw in the screw-nut-connections may alternatively be fixed to the actuating element. The actual use will decide whatever is the most convenient. In the shown and preferred embodiment, the nut is connected to the actuating element.

The actuating element may be connected to a cutting knife in a blow-out preventer. This shows that considerable actuator power may be produced by means of the power actuator.

The motor may comprise at least two individual sets of windings in order to provide the necessary redundancy.

In accordance with a second aspect of the invention a method for submerged use of power actuator at petroleum exploitation is provided, where an electric motor drives a displaceable actuating element via a transmission element, and where the method is characterized in comprising:
 to provide the power actuator with at least two parallel and cooperative screw-nut-connections; and
 to connect the screw-nut-connections to the actuating element, the transmission elements comprising a driving wheel which synchronically drives a screw and a nut in each of the at least two screw-nut-connections.

The method may comprise to connect the actuating element to a cutting knife in a blow-out preventer.

The device and the method in accordance with the invention thus provide a relatively compact and light power actuator for submerged use at petroleum exploitation. The power actuator is arranged to be able to be controlled by an operator both with regard to the power which it exerts and the relative position of the actuating element in the power actuator.

In the following an example of a preferred embodiment and method is described, which is illustrated in the enclosed drawings, where:

Figure 1:
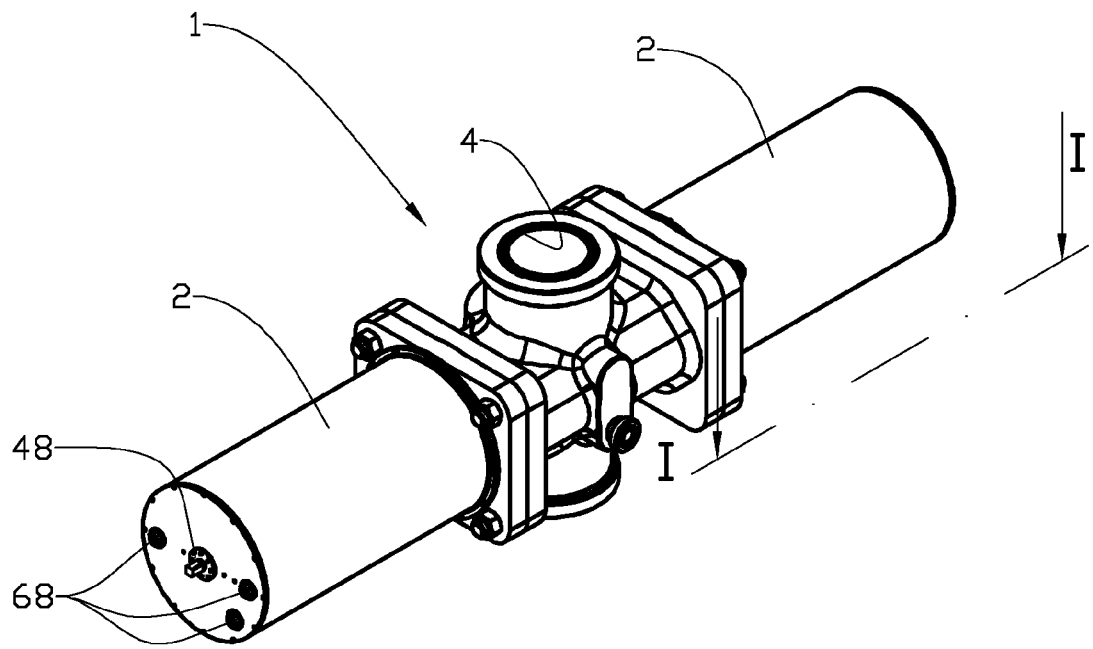
FIG. 1 is a perspective view of two power actuators in accordance with the invention, which are connected to a blow-out preventer.

In the drawings the reference numeral 1 denotes a blow-out preventer provided with two power actuators 2. A through bore 4 in the blow-out preventer 1 is provided with cutting knives 6.

Figure 2:
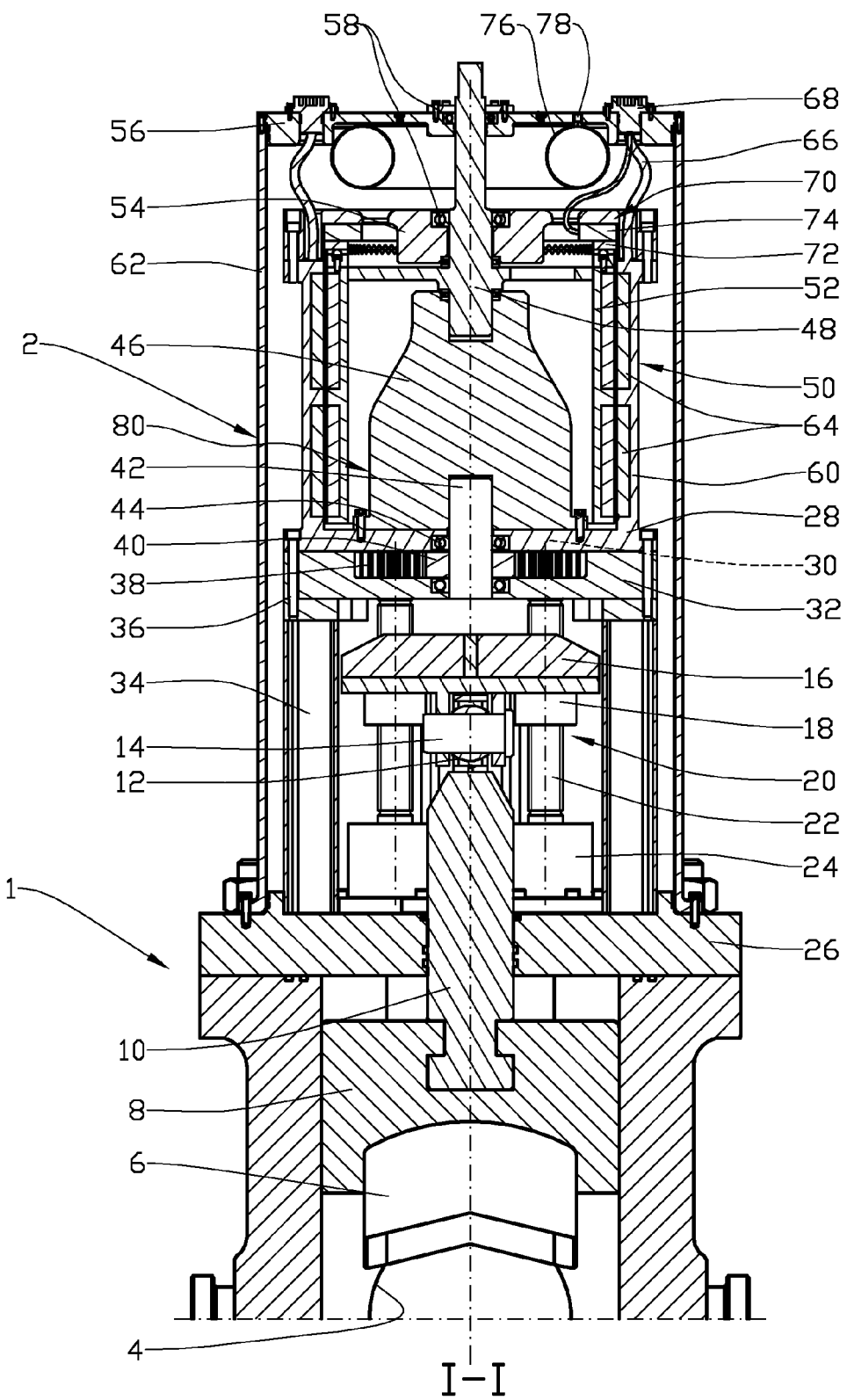
FIG. 2 shows a cross section I-I of FIG. 1 in a larger scale.
Figure 3:
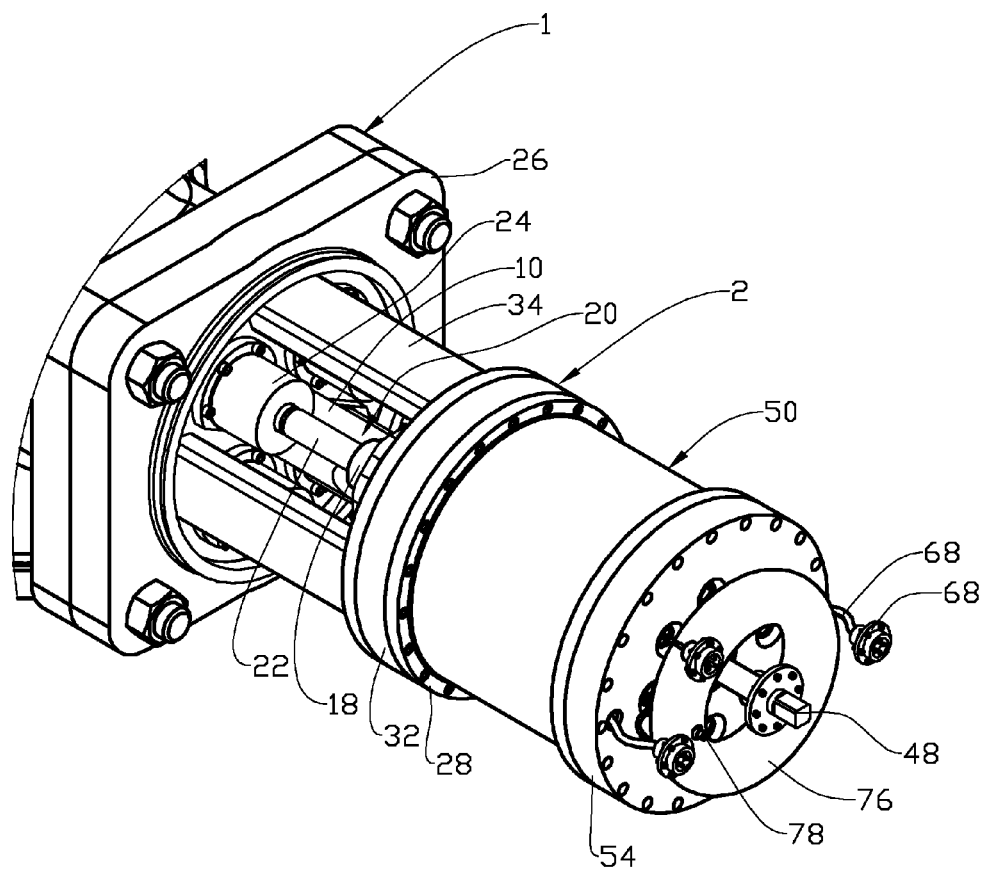
FIG. 3 is a perspective view of a power actuator where an external end cover and an actuator sheath are removed.

Reference is now made to FIG. 2. The cutting knife 6 is connected to a knife guide 8 constituting a steering for the cutting knife 6. An actuator mandrel 10 connects the knife guide 8 by means of a self-aligning plain bearing 12 and a bolt 14 to a displaceable actuating element 16.

The actuating element 16 is connected to four nuts 18 belonging to a screw-nut-connection 20 each, two of which are shown in FIG. 2. The screw-nut-connections' 20 screws 22, which are revolving, are at their one end portion, by means of a first bearing 24, connected to a mounting plate 26 which is bolted to the blow-out preventer 1. In their opposite end portion the screws 22 are supported in a motor housing 28 by means of a second bearing 30. The second bearing 30 is not shown in FIG. 2, but shows in FIG. 4. The screws 22 thus are prevented from being able to be axially displaced in the power actuator 2.

The motor housing 28 and a gear housing 32 are by means of a bar 34 and a bolt connection 36 connected to the mounting plate 26.

Figure 4:
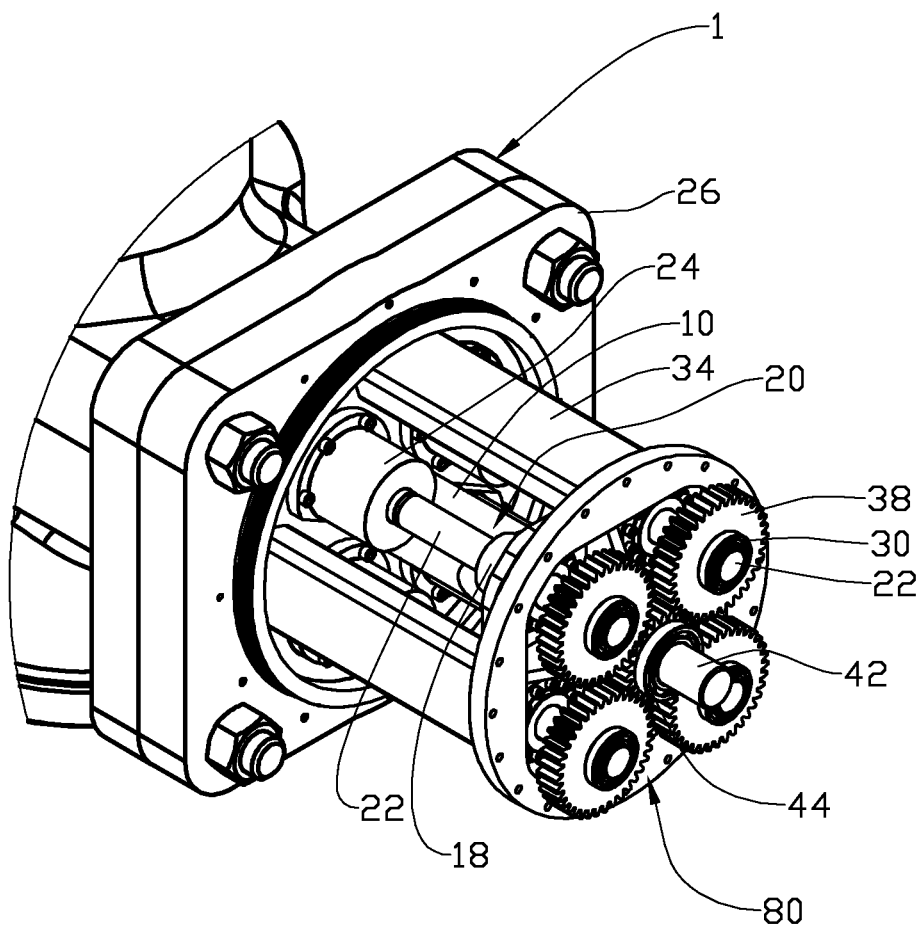
FIG. 4 shows the same as FIG. 3, but where also an electric motor and a planetary gear are removed.

Each screw 22 is provided with an actuating wheel 38, see FIGS. 2 and 4, which is engaged with a driving wheel 40. The driving wheel 40 is connected to a drive shaft 42 supported in the motor housing 28 and in the gear housing 32 by means of drive shaft bearings 44.

The drive shaft 42 is connected to the outgoing side of a planetary gear 46, as the ingoing side of the planetary gear 46 is connected to a motor mandrel 48. The planetary gear 46 is connected to the motor housing 28.

The motor mandrel 48, which also supports the anchor 52 of an electric motor 50, is supported in an end plate 54 and in an end cover 56 by means of mandrel bearings 58.

The end plate 54 is connected to the motor housing 28 where the stator 60 of the motor 50 is also connected. The end cover 56 is connected to the mounting plate 26 via an actuator sheath 62.

The motor mandrel 48 protrudes through the end cover 56 and is arranged to be able to be rotated by a not shown, external motor, for example in the form of an ROV.

The electric motor 50 is provided with two independent windings 64 that separately are arranged to be able to drive the motor 50. The windings 64 are added power through cables 66 and bushings 68.

The power actuator 2 is provided with an electromagnetic brake 70 where a brake collar 72 abuts the anchor 52. The brake 70 is released by means of a coil 74 when the motor 50 is to be started.

The power actuator 2 is filled with a fluid, typically silicon oil. A pressure compensator 76 of an embodiment known per se is communicating with the ambient pressure by means of a channel 78 through the end cover 56.

When the cutting knife 6 is to be activated, the brake 70 is released first, and then power is added by one of the windings 64 so that the motor 50 starts. The anchor 52 of the motor 50 drives the respective screws 22 in the screw-nut connections 20, via the motor mandrel 48 and the transmission element 80 which is constituted of the planetary gear 46, the drive shaft 42, the drive wheel 40 and the actuating wheels 38. The nuts 18 together with the actuating element 16, the actuating mandrel 10, the knife guiding 8 and the cutting knife 6 are thus displaced towards a not shown pipe which is in the bore 4 as illustrated in FIG. 2 where the cutting knife 6 is on its way from its withdrawn position. The force and relative position of the cutting knife 6 are controlled from the surface as explained in the general part.

The invention claimed is:

1. Power actuator device for activation of a cutting knife or similar device in a submerged system as used at petroleum exploitation, where the power actuator has an electric motor that drives a displaceable actuating element via a transmission element, wherein the rotational torque to linear force conversion components of the power actuator comprise at least two non-axially-aligned parallel and cooperative screw-nut-connections connected to the actuating element, and where the transmission elements comprise a driving wheel which synchronically drives a screw or a nut in each of the at least two screw-nut-connections and where a planetary gear that is positioned inside the drive motor, is connected by a drive shaft and a motor mandrel.

2. Device in accordance with claim 1, where the driving wheel is constituted of a gear wheel where the gear wheel is in engagement with actuating wheels which are connected to the screw or the nut in the screw-nut-connections.

3. Device in accordance with claim 1, where the driving wheel is constituted of a cogged transmission wheel where the cogged transmission wheel is in engagement with actuating wheels which are connected to the screw or the nut in the screw-nut-connections.

4. Device in accordance with claim 1, where the nut in the screw-nut-connections is connected to the actuating element.

5. Device in accordance with claim 1, where the screw in the screw-nut-connections is connected to the actuating element.

6. Device in accordance with claim 1, where the motor mandrel is designed to be rotated by an external motor.

7. Device in accordance with claim 1, where the motor comprises at least two individual sets of windings.

8. Method for activation of cutting knife or a similar device in a submerged system used at petroleum exploitation by use of a power actuator, where an electric motor drives a displaceable actuating element via a transmission element, wherein the method comprising:
to provide the power actuator with at least two parallel and cooperative screw-nut-connections configured to convert a torque to a linear force;
to connect the screw-nut-connections to the actuating element, the transmission elements comprising a driving wheel which synchronically drives a screw or a nut in each of the at least two screw-nut-connections; and
connecting a planetary gear that is positioned inside the drive motor, between a drive shaft and a motor mandrel.

* * * * *